(12) United States Patent
Ueyama et al.

(10) Patent No.: US 10,944,881 B2
(45) Date of Patent: Mar. 9, 2021

(54) DOCUMENT TRANSPORT ASSISTANCE MEMBER AND IMAGE PROCESSING DEVICE

(71) Applicant: SEIKO EPSON CORPORATION, Tokyo (JP)

(72) Inventors: Naohiro Ueyama, Matsumoto (JP); Ryuichi Sato, Shiojiri (JP); Kazumitsu Fujimori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/939,356

(22) Filed: Jul. 27, 2020

(65) Prior Publication Data

US 2021/0037157 A1 Feb. 4, 2021

(30) Foreign Application Priority Data

Jul. 30, 2019 (JP) .............................. JP2019-139501
Aug. 26, 2019 (JP) .............................. JP2019-153543

(51) Int. Cl.
*H04N 1/00* (2006.01)
*B65H 5/06* (2006.01)

(52) U.S. Cl.
CPC ......... *H04N 1/00806* (2013.01); *B65H 5/062* (2013.01); *H04N 1/00588* (2013.01);
(Continued)

(58) Field of Classification Search
CPC ........... H04N 1/00806; H04N 1/00588; H04N 1/00602; H04N 1/00676; H04N 1/00713; H04N 1/00718; H04N 1/00737; H04N 1/00745; H04N 1/0057; H04N 1/00628; H04N 1/00652; H04N 1/0071; H04N 1/0074; H04N 1/00753; H04N 1/00769;
(Continued)

(56) References Cited

U.S. PATENT DOCUMENTS 5,267,009 A * 11/1993 Takada ............... G03G 15/6523
271/225
2013/0264457 A1* 10/2013 Ueyama ................... B41J 29/04
248/674
(Continued)

FOREIGN PATENT DOCUMENTS

| JP | H09-233264 | 9/1997 |
|----|------------|--------|
| JP | 2004-021227 | 1/2004 |

*Primary Examiner* — Negussie Worku
(74) *Attorney, Agent, or Firm* — Workman Nydegger

(57) ABSTRACT

A document transport assistance member for an image processing device including a transport roller and a reading part provided upstream of the transport roller in a transport path, the document transport assistance member including a cover sheet, a support sheet, and a bonding part that serves as a bonding part where the cover sheet and the support sheet are bonded together, and bonds a first end portion at a first direction side along a first axis, wherein a length between a side end of the document transport assistance member at the first direction side and a rear end of the bonding part at the opposite side from the first direction is greater than a length between a reading position where the reading part can read the document and a position of a nipping part where the transport roller performs nip on the document transport assistance member in the transport path.

9 Claims, 12 Drawing Sheets

(52) U.S. Cl.
CPC ..... *H04N 1/00602* (2013.01); *H04N 1/00676* (2013.01); *B65H 2801/39* (2013.01)

(58) Field of Classification Search
CPC ........... H04N 1/00774; H04N 1/00777; H04N 1/0464; H04N 1/1235; H04N 1/125; H04N 1/193; H04N 1/203; H04N 2201/0081; B65H 5/062; B65H 2801/39; B65H 2220/02; B65H 2220/01; B65H 2511/11; B65H 2511/524; B65H 2513/11; B65H 2301/4474; B65H 2220/03; B65H 2511/414; B65H 2513/104; B65H 2513/222; B65H 2513/512; B65H 2511/13; B65H 2513/41; B65H 2701/1311; B65H 2701/1313; B65H 2220/09; B65H 2220/11; B65H 2404/14; B65H 7/12; B65H 2301/44514; B65H 2404/1442; B65H 2511/514; B65H 2801/06; B65H 3/565; G03G 15/235; G03G 15/6564; G03G 2215/004; G03G 2215/00637
USPC ........................................................ 358/498
See application file for complete search history.

(56) References Cited

U.S. PATENT DOCUMENTS

| | | | |
|---|---|---|---|
| 2016/0313687 A1* | 10/2016 | Osada | B42C 9/0006 |
| 2019/0132464 A1* | 5/2019 | Miyauchi | H04N 1/00602 |
| 2019/0256309 A1* | 8/2019 | Shiota | B65H 5/36 |
| 2019/0306356 A1* | 10/2019 | Watanabe | B65H 5/062 |
| 2019/0313687 A1* | 10/2019 | Hayashi | A23G 9/26 |
| 2020/0099811 A1* | 3/2020 | Shimazu | H04N 1/00602 |

* cited by examiner

DOCUMENT TRANSPORT ASSISTANCE MEMBER AND IMAGE PROCESSING DEVICE

The present application is based on, and claims priority from JP Application Serial Number 2019-139501, filed Jul. 30, 2019, and 2019-153543, filed Aug. 26, 2019, the disclosures of which are hereby incorporated by reference herein in its entirety.

BACKGROUND

1. Technical Field

The present disclosure relates to a document transport assistance member and an image processing device that can use the document transport assistance member.

2. Related Art

In the related art, a document transport assistance member including a cover sheet and a base sheet that sandwich a document is known as disclosed in JP-A-2004-21227. One end of the cover sheet and one end of the base sheet are joined in the document transport assistance member.

When the document transport assistance member is fed into an image processing device, however, the posture of the document transport assistance member that is being transported may be varied under the influence of the configuration of a transport roller that transports the document transport assistance member and the like, for example. Consequently, the separation state between a reading part of the image processing device and the document varies, and the reading accuracy of the reading part is disadvantageously reduced.

SUMMARY

A document transport assistance member is configured to be used for an image processing device, the image processing device including a first transport roller configured to transport a document, and a reading part configured to read image information of the document, which is transported, at a position upstream of the first transport roller in a transport path through which the document is transported, the document transport assistance member including a cover sheet configured to cover a first surface of the document, the first surface being a surface to be read by the reading part, and a support sheet configured to cover a second surface of the document, the second surface being an opposite surface from the first surface, the document transport assistance member further including a first bonding part serving as a bonding part where the cover sheet and the support sheet are bonded together, the first bonding part being configured to bond a first end portion at a first direction side along a first axis. A length between a leading end of the document transport assistance member and a rear end of the first bonding part is greater than a length between a reading position where the reading part is configured to read the document and a position of a first nipping part where the first transport roller performs nip on the document transport assistance member in the transport path, the leading end of the document transport assistance member being an end of the document transport assistance member at the first direction side, and the rear end of the first bonding part being an end of the first bonding part at a second direction side that is an opposite direction from the first direction.

DESCRIPTION OF EXEMPLARY EMBODIMENTS

1. First Embodiment

First, a configuration of an image processing device 1 is described.

Figure 1:
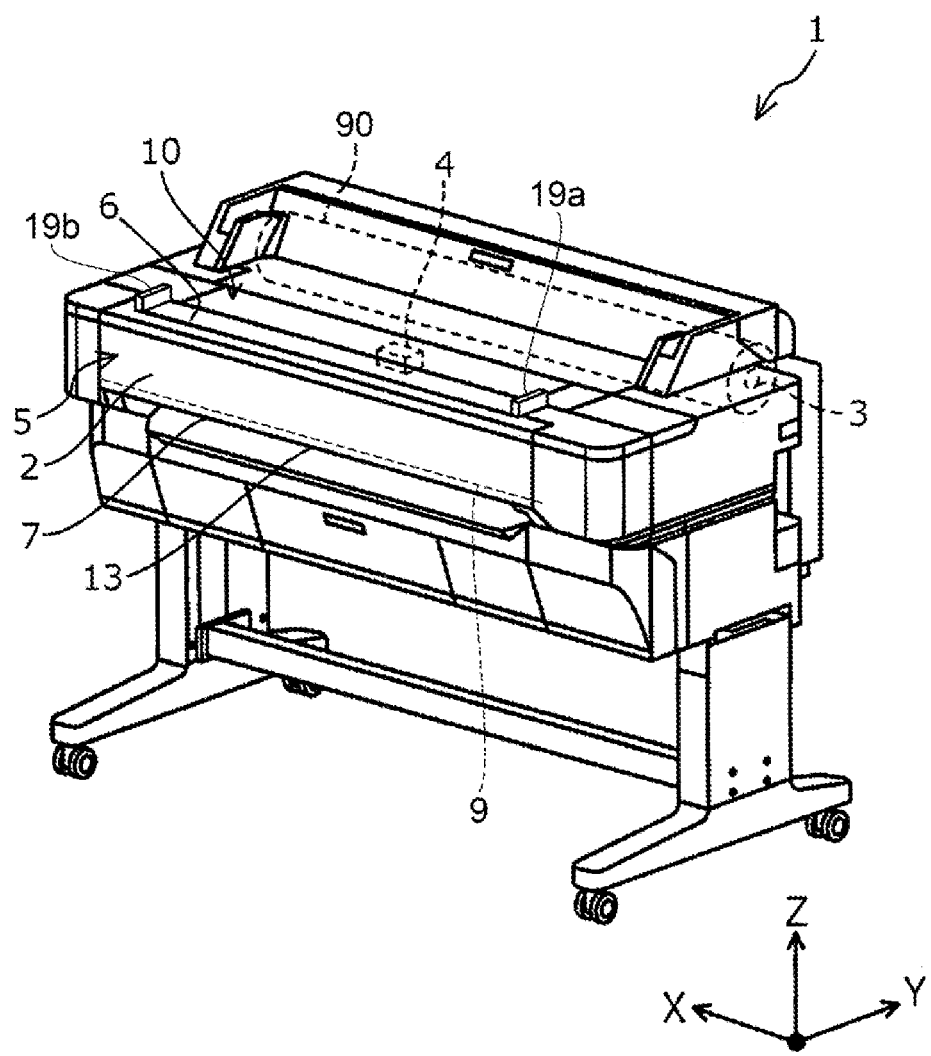
FIG. 1 is a perspective view illustrating a configuration of an image processing device according to a first embodiment.
Figure 2:
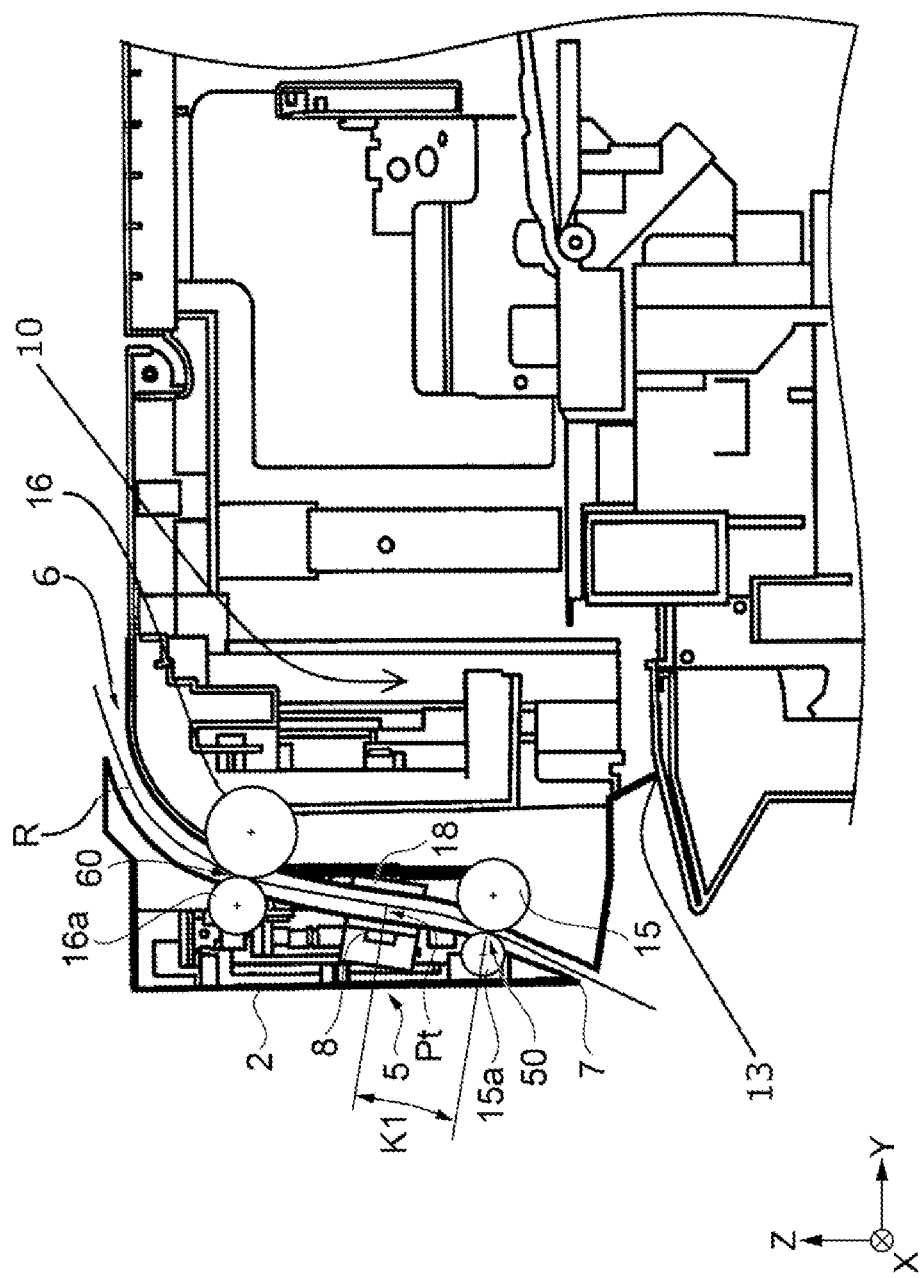
FIG. 2 is a schematic view illustrating an internal configuration of the image processing device according to the first embodiment.

FIG. 1 is a perspective view illustrating a configuration of the image processing device 1. FIG. 2 is a schematic view illustrating an internal configuration of the image processing device 1.

As illustrated in FIG. 1, the image processing device 1 includes a main body part 10. The main body part 10 includes a roll setting part 3 configured to set a roll 90 of a recording medium, a recording head 4 capable of forming an image by discharging an ink to the recording medium, and a recording medium ejection port 13 configured to eject the recording medium on which an image has been formed by the recording head 4.

In addition, the image processing device 1 includes a scanner unit 5 configured to read a document M. Specifically, the image processing device 1 of this embodiment has a configuration that can be used also as a recording device, and has a configuration that can record an image read from the document M by the scanner unit 5 to a recording medium by using the recording head 4, for example.

As illustrated in FIG. 2, the scanner unit 5 includes a supply port 6 configured to supply the scanner unit 5 with a document M to be read, a reading part 8, and an ejection port 7 configured to eject the document read by the reading part 8. A transport path R is a path through which the document M is transported from the supply port 6 to the ejection port 7 via the reading part 8. The scanner unit 5 of this embodiment is configured such that the document M contained in a document transport assistance member 100 described later is transported through the transport path R, and the document M can be read.

In the transport path R, a first transport roller 15 configured to transport the document M is disposed downstream of the reading part 8. In addition, a second transport roller 16 configured to transport the document M is disposed upstream of the reading part 8.

The reading part 8 is configured to read image information of the document M that is being transported. The reading part 8 of this embodiment is a contact optical sensor (contact image sensor (CIS)). The reading part 8 is a line sensor, and includes a photo sensor, a light source part, a lens, and the like. A plate-shaped support plate 18 configured to support the document M that is being transported is provided at a position facing the reading part 8, and the image information of the document M supported by the support plate 18 is read. Here, the position where the reading part 8 faces the photo sensor in the transport path R is a reading position Pt where the reading part 8 can read the document M.

The reading part 8 is disposed at a cover part 2. The cover part 2 is configured such that the cover part 2 can be opened and closed about a rotational shaft 9 extending along the X-axis with respect to the main body part 10. While the reading part 8 is disposed on the cover part 2 side in this embodiment, this is not limitative, and the reading part 8 may be disposed on the main body part 10 side.

The first transport roller 15 is a driving roller configured to transport the document M. In this embodiment, a first nip roller 15a is provided to the first transport roller 15. The first nip roller 15a is biased toward the first transport roller 15. Thus, the document M can be transported in the state where the document M and/or the document transport assistance member 100 is nipped between the first transport roller 15 and the first nip roller 15a. Note that in this embodiment, the part where the document transport assistance member 100 is nipped, i.e., nipped, between the first transport roller 15 and the first nip roller 15a corresponds to a first nipping part 50.

The second transport roller 16 is a driving roller configured to transport the document M. In this embodiment, a second nip roller 16a is provided to the second transport roller 16. The second nip roller 16a is biased toward the second transport roller 16. Thus, the document M can be transported in the state where the document M and/or the document transport assistance member 100 is nipped between the second transport roller 16 and the second nip roller 16a. Note that in this embodiment, the part where the document transport assistance member 100 is nipped, i.e., nipped, between the second transport roller 16 and the second nip roller 16a corresponds to a second nipping part 60.

In this embodiment, the amount of the document M and/or the document transport assistance member 100 transported by the first transport roller 15 in a certain time period is greater than the amount of the document M and/or the document transport assistance member 100 transported by the second transport roller 16. In other words, the first transport roller 15 is controlled at a speed higher than that of the second transport roller 16.

In addition, edge guides 19a and 19b configured to guide both ends of the document M in the X direction are provided in the vicinity of the supply port 6 of the scanner unit 5. The edge guide 19a and the edge guide 19b are provided on the side of the end portion of the −X direction and the side of the end portion of the +X direction, respectively, of the supply port 6 provided along the X axis. The edge guide 19a is a home-side guide, and a guide surface provided in the edge guide 19a that makes contact with one end of the document M serves as a set reference position of the document M with respect to the scanner unit 5. On the other hand, the edge guide 19b is an away-side guide and moves along the X axis with respect to the edge guide 19a on the home-side in accordance with the size of the document M set in the scanner unit 5.

Figure 3:
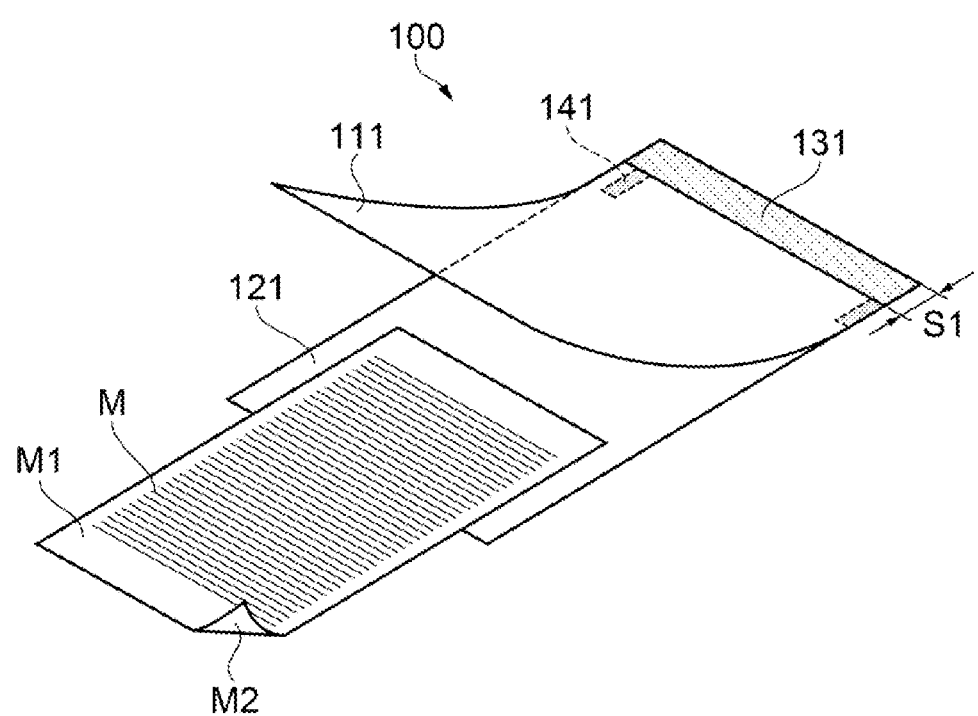
FIG. 3 is a perspective view illustrating a configuration of the document transport assistance member according to the first embodiment.
Figure 4:
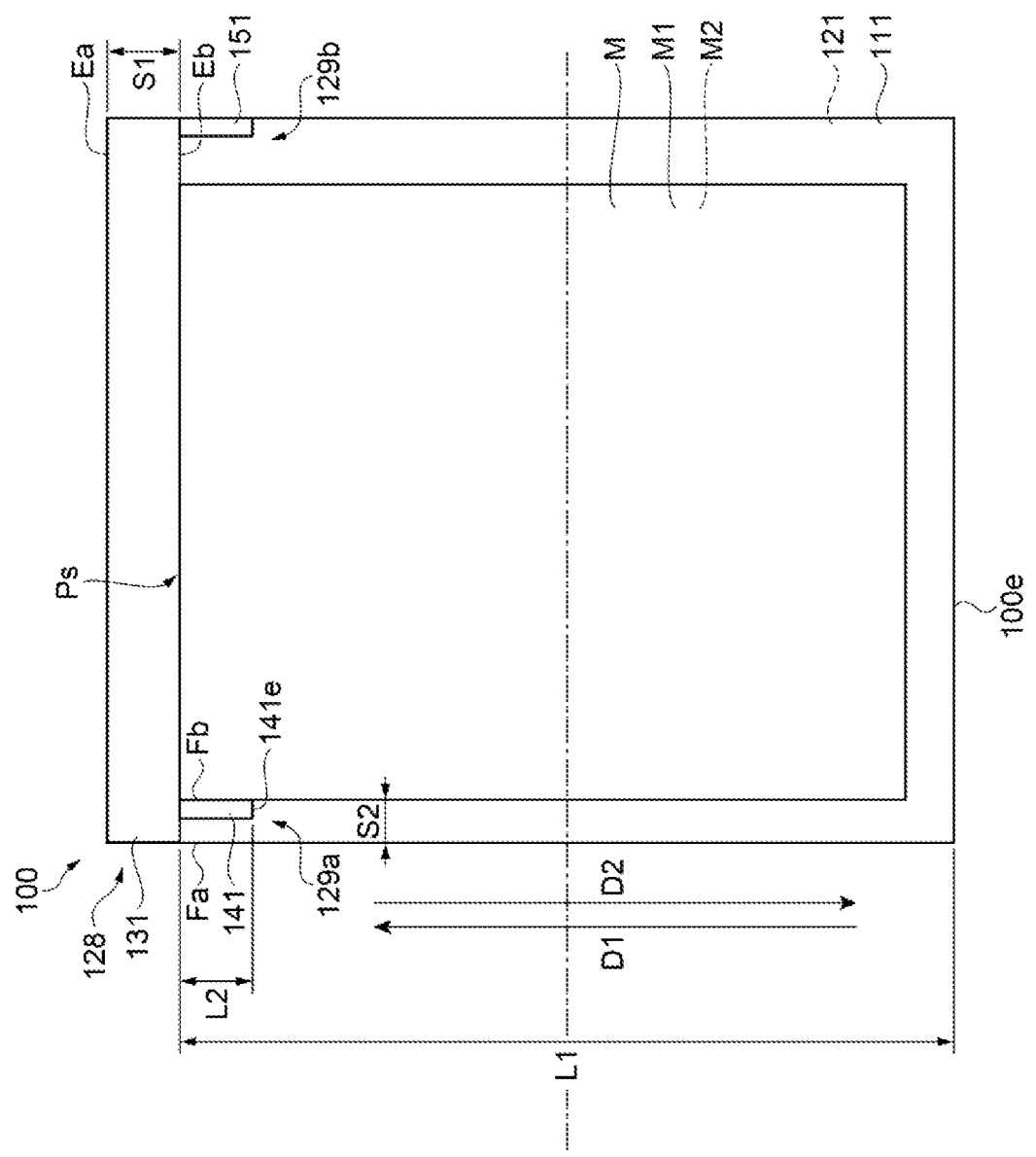
FIG. 4 is a plan view illustrating a configuration of the document transport assistance member according to the first embodiment.
Figure 5:
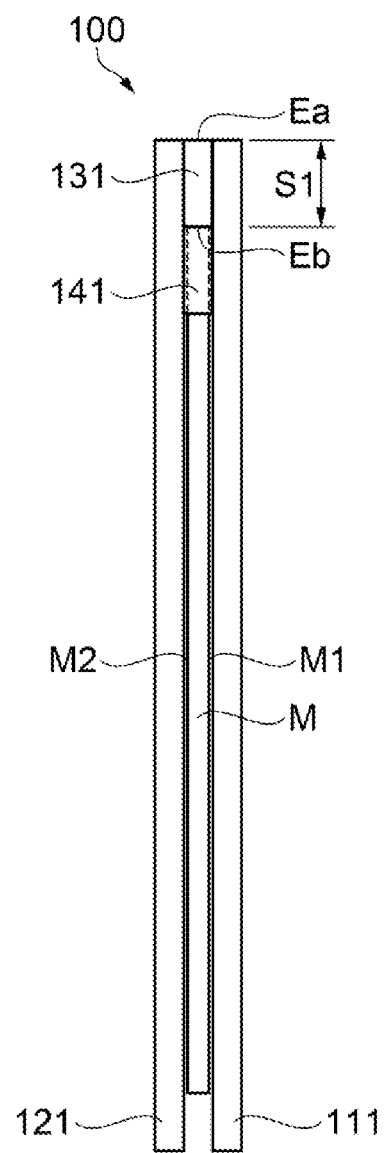
FIG. 5 is a side view illustrating a configuration of the document transport assistance member according to the first embodiment.

Next, a configuration of the document transport assistance member 100 that can be used in the image processing device 1 is described. FIG. 3 is a perspective view illustrating a configuration of the document transport assistance member 100, FIG. 4 is a plan view illustrating a configuration of the document transport assistance member 100, and FIG. 5 is a side view illustrating a configuration of the document transport assistance member 100. Note that FIGS. 4 and 5 illustrate a state where the document M is contained in the document transport assistance member 100.

The document transport assistance member 100 is a carrier sheet for smoothly transporting the document M through the transport path R of the image processing device 1 when the image information of the document M is read by the reading part 8 of the image processing device 1. The size of the document M that can be applied to the document transport assistance member 100 is not limited. The document transport assistance member 100 can be applied to the document M having a width of 36 inches, for example.

As illustrated in FIGS. 3 to 5, the document transport assistance member 100 includes a cover sheet 111 configured to cover a first surface M1 of the document M that is read by the reading part 8, and a support sheet 121 configured to cover a second surface M2 opposite the first surface M1 of the document M, and the document transport assistance member 100 is configured by bonding the cover sheet 111 and the support sheet 121 together.

The cover sheet 111 is a transparent PET sheet having a thickness of approximately 0.1 mm. The cover sheet 111 is a sheet having a size larger than the maximum size of the document M that can be used in the image processing device 1. In other words, the cover sheet 111 is configured such that it can cover the entire surface of the document M. The surface of the cover sheet 111 that makes contact with the first nip roller 15a is provided with micro bumping for the purpose of reducing light reflection. This reduces irregular reflection at the surface of the cover sheet 111 with scratches and the like even when scratches and the like are caused on the surface of the cover sheet 111 due to contact with the first nip roller 15a and the like, and thus the reading accuracy at the reading part 8 can be ensured.

The support sheet 121 is an opaque PET sheet having a thickness of approximately 0.1 mm. The color of the surface of the support sheet 121 on which the document M is placed is white, for example. The support sheet 121 has a size equivalent to that of the cover sheet 111.

The document transport assistance member 100 includes a first bonding part 131 where the cover sheet 111 and the support sheet 121 are bonded together. Specifically, as illustrated in FIG. 4, the first bonding part 131 is provided at a first end portion 128 on a side of a first direction D1 along a first axis. The first axis is a virtual axis along the transport path R when the document transport assistance member 100 is transported in the transport path R. The first direction D1 indicates the transport direction of the document transport assistance member 100 in the transport path R. The cover sheet 111 and the support sheet 121 are bonded together with the edges on the first direction D1 side thereof aligned with each other.

The first bonding part 131 is provided in a band shape along a second axis that intersects the first direction D1. In the first bonding part 131, the cover sheet 111 and the support sheet 121 are bonded together with an adhesive tape and/or by ultrasonic welding, for example.

A length S1 between a leading end Ea of the document transport assistance member 100 on the first direction D1 side and a rear end Eb of the first bonding part 131 on the side opposite the first direction D1 is greater than a length K1 between the reading position Pt where the reading part 8 can read the document M and the position of the first nipping part 50 where the first transport roller 15 performs nip on the document transport assistance member 100 in the transport path R. The specific position of the first nipping part 50 is the center position of the nip width when the first transport roller 15 and the first nip roller 15a press the document transport assistance member 100 in the transport direction. In addition, the length K1 is a length to the reading position Pt from the position of the first nipping part 50 in the transport path R, and includes a bent portion of the transport path R to some degree. In other words, the length K1 is not the shortest distance between the first nipping part 50 and the reading position Pt.

Note that regarding the reading part 8 of this embodiment, the reading area is substantially equal to a line extending in a direction intersecting the transport path R, but when the reading area has a certain length in the transport path R, the upstream end of the reading area is considered as the reading position Pt. In this case, the length K1 is the length to the upstream end of the reading area from the position of the first nipping part 50 in the transport path R. In a configuration in which a plurality of the reading parts 8 of this embodiment are arranged in the direction along the transport path R, the length K1 is the length in the transport path R from the position of the first nipping part 50 downstream of the most downstream reading part 8 to the reading position Pt of the most upstream reading part.

The length K1 between the reading position Pt and the position of the first nipping part 50 in the transport path R is, for example, 65 mm, and the length S1 between the rear end Eb and the leading end Ea of the document transport assistance member 100 is approximately 70 mm.

The leading end Ea of the document transport assistance member 100 is an edge of the cover sheet 111 and the support sheet 121 on the first direction D1 side. The rear end Eb of the first bonding part 131 has a straight-line shape along the second axis. The rear end Eb is a reference end of the document M in the first direction D1. Specifically, by bringing the edge of the document M in the first direction D1 into contact with the rear end Eb, a reading reference position of the document M is stabilized. In the case where the edge of the document M in the first direction D1 is brought into contact with the rear end Eb, the edge of the document M in contact with the rear end Eb serves as a reading start position Ps. In other words, the reading start position Ps corresponds to the most upstream edge of the document M. In addition, the region from the rear end Eb to the leading end Ea is a margin region that does not contribute to the reading process of the reading part 8. Note that the entire region from the leading end Ea to the rear end Eb may not be the bonding region. Specifically, regarding the first bonding part 131, it suffices that the rear end Eb is formed, and the edge portion of the cover sheet 111 and the support sheet 121 on the first direction D1 side may not be bonded.

In addition, the document transport assistance member 100 is disposed along the first axis and includes a second bonding part 141 at a position that overlaps the contained document M in a side view of the document transport assistance member 100 from the second axis that intersects the first axis as illustrated in FIG. 5. In the second bonding part 141, the cover sheet 111 and the support sheet 121 are bonded together by the same method as the first bonding part 131.

Specifically, as illustrated in FIG. 4, the second bonding part 141 is formed along the first axis from an end portion of the first bonding part 131 with respect to the second axis. In this embodiment, the second bonding part 141 is located at a one end portion 129a with respect to the second axis that intersects the first axis in the document transport assistance member. In addition, the second bonding part 141 includes a portion on the side of a second direction D2, which is the direction opposite the first direction, relative to the first bonding part 131 with respect to the first axis. In addition, the second bonding part 141 of this embodiment is located at the one end portion 129a corresponding to the edge guide 19a side in the document transport assistance member 100.

The second bonding part 141 is formed toward the second direction D2 from the rear end Eb of the first bonding part 131 on the second direction D2 side. The dimension of the second bonding part 141 disposed along the first axis is equal to or smaller than half of the dimension of the document transport assistance member 100 along the first axis. In other words, the second bonding part 141 is disposed in a portion of the region along the first axis of the document transport assistance member 100, rather than in the entirety of the region along the first axis of the document transport assistance member 100. In this embodiment, a rear end 141e of the second bonding part 141 on the second direction D2 side is located on the first direction D1 side relative to a midpoint of a length L1 between the rear end Eb of the first bonding part 131 on the second direction D2 side and a rear end 100e of the document transport assistance member 100 on the second direction D2 side. As a result, with respect to the support sheet 121, more than half of the cover sheet 111 can be opened, and thus the document M can be smoothly inserted.

More preferably, the dimension of the second bonding part 141 disposed along the first axis is approximately ⅕ of the dimension of the document transport assistance member 100 along the first axis. Specifically, a length L2 along the first axis between the rear end 141e of the second bonding part 141 and the rear end Eb of the first bonding part 131 is smaller than two inches. In this manner, in particular, the length L2 defined by the second bonding part 141 is smaller than the short side of the document M of the smallest size such as the document M of a business card size, and thus, even when putting the document M of the minimum size, the corner end of the document M can be aligned with the first bonding part 131 and the second bonding part 141 in the state where the document M is partially exposed. Thus, the document M can be easily put in the document transport assistance member 100.

Note that, as described later, when the document transport assistance member 100 is set in the image processing device 1, the second bonding part 141 is located on the first direction side relative to the portion where the document transport assistance member 100 is bent.

In addition, the cover sheet 111 and the support sheet 121 are not bonded together in the region on the second direction D2 side relative to the second bonding part 141. In other words, in the document transport assistance member 100, the second bonding part 141 is not formed in the entire region of the one end portion 129a, and the second bonding part 141 is provided only in a portion of the region of the one end portion 129a. In this manner, the openable region for separating the cover sheet 111 from the support sheet 121 is relatively wide, and thus the document M can be smoothly inserted between the support sheet 121 and the cover sheet 111. In addition, when the document M is put in the document transport assistance member 100, the side end of the document M is regulated by the second bonding part 141. Thus, protrusion of the document M from the document transport assistance member 100 is suppressed, and the end portion of the document M can be protected.

In the document transport assistance member 100, the cover sheet 111 and the support sheet 121 are not bonded together in the region along the second axis between the second bonding part 141 and another end portion 129b opposite the one end portion 129a, except in the first bonding part 131. In other words, no bonding part is provided on the inner side relative to the second bonding part 141 on the other end portion 129b side in the document transport assistance member 100. Thus, the size of the document M that can be contained in the document transport assistance member 100 is not fixed to one type, and the documents M of a wide variety of sizes can be applied. Specifically, the document transport assistance member 100 can contain the document M of various sizes, from a business card size to a 36-inch size.

Note that the second bonding part 141 is separated from a first end Fa serving as one side end of the cover sheet 111 and the support sheet 121. Specifically, a length S2 along the second axis between a second end Fb of the second bonding part 141 on the other end portion 129b direction side relative to the first end Fa and the first end Fa of the document transport assistance member 100 is approximately 0.5 inches. The second end Fb of the second bonding part 141 has a straight-line shape in the first direction D1. In addition, the angle between the rear end Eb of the first bonding part 131 and the second end Fb of the second bonding part 141 is approximately 90 degrees. Therefore, the reading reference position of the document M is defined by bringing the document M into contact with the rear end Eb of the first bonding part 131 and the second end Fb of the second bonding part 141.

In addition, in this embodiment, as illustrated in FIG. 4, a third bonding part 151 is formed along the first axis from the other end of the first bonding part 131 on the side opposite to the second bonding part 141 with respect to the second axis. The dimension of the third bonding part 151 disposed along the first axis is the same as the dimension of the second bonds 141. More preferably, the dimension of the third bonding part 151 disposed along the first axis is approximately ⅕ of the dimension of the document transport assistance member 100 along the first axis. In other words, the third bonding part 151 is disposed in a portion of the region along the first axis of the document transport assistance member 100, rather than in the entirety of the region along the first axis of the document transport assistance member 100.

The second bonding part 141 and the third bonding part 151 are provided on both ends of the document transport assistance member 100 in the second direction D2. Specifically, the dimension of the document transport assistance member 100 in the second direction D2 is larger than the dimension along the second axis of the document M that can be contained in the document transport assistance member 100, and thus a margin is provided on both end portions with respect to the second axis with respect to the contained document M. In addition, no bonding part that bonds the cover sheet 111 and the support sheet 121 together is provided between the second bonding part 141 and the third bonding part 151. Thus, the document M of different sizes can be contained.

Next, an operation of the document transport assistance member 100 in the image processing device 1 is described.

Figure 6:
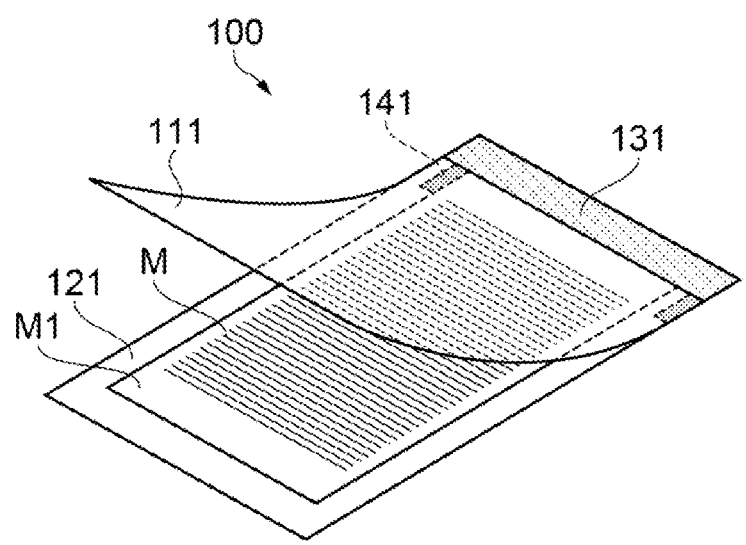
FIG. 6 is a schematic view illustrating an operation of the document transport assistance member according to the first embodiment.
Figure 7:
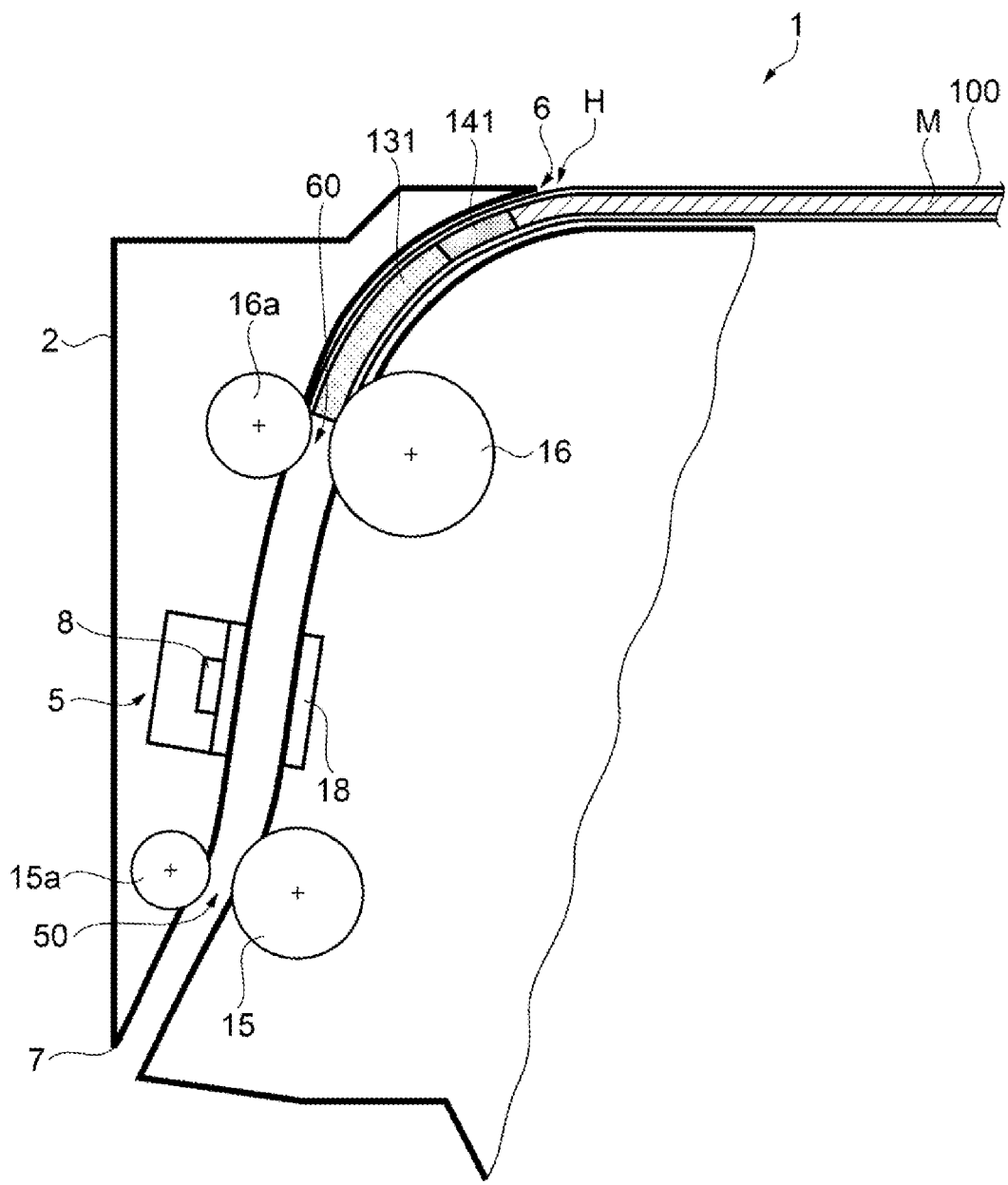
FIG. 7 is a schematic view illustrating an operation of the document transport assistance member according to the first embodiment.

FIGS. 6 to 9 are schematic views illustrating an operation of the document transport assistance member 100. Note that, in FIG. 7, illustration of the second bonding part 141 is omitted.

First, the user puts the document M in the document transport assistance member 100. Specifically, as illustrated in FIG. 6, the cover sheet 111 is lifted from the support sheet 121. At this time, since the cover sheet 111 and the support sheet 121 are bonded at the first bonding part 131 of the first end portion 128 and at the second bonding part 141 and the third bonding part 151 provided in the portions along the first direction D1 of the document transport assistance member 100, the cover sheet 111 can be more largely lifted from the support sheet 121 in comparison with a case where the second bonding part 141 is disposed in the entire end portion in the first direction of the document transport assistance member 100, for example. Thus, the document M can be easily inserted between the cover sheet 111 and the support sheet 121. The document M is placed on the support sheet 121 in the state where the first surface M1 to be read by the reading part 8 faces the upper side. Then, the lifted cover sheet 111 is lowered to the support sheet 121 side. Thus, the document M is put in the document transport assistance member 100.

In addition, the document M is put in the document transport assistance member 100 such that the edges of the document M are in contact with the rear end Eb of the first bonding part 131 and the second end Fb of the second bonding part 141. The length L2 of the second bonding part 141 along the first axis is, for example, approximately two inches, and is relatively short. Thus, the cover sheet 111 can be more largely lifted from the support sheet 121, and the corner end of the document M can be aligned with the first bonding part 131 and the second bonding part 141 in the state where the document M is partially exposed. Thus, the document M can be easily put in the document transport assistance member 100, and the reading reference position of the document M is defined. Then, the edge of the document M in contact with the rear end Eb serves as the reading start position Ps.

Next, as illustrated in FIG. 7, the document transport assistance member 100 is set at a transport start position of the scanner unit 5 of the image processing device 1. Specifically, the first end portion 128 is inserted from the supply port 6 along the transport path R with the cover sheet 111 facing the upper side such that the cover sheet 111 faces the reading part 8. The member is once inserted to a position where the leading end Ea of the document transport assistance member 100 makes contact with the second transport roller 16. The position where the leading end Ea of the document transport assistance member 100 makes contact with the second transport roller 16 is the transport start position.

As illustrated in FIG. 7, when the document transport assistance member 100 is set at the transport start position of the image processing device 1, the document transport assistance member 100 is placed along the outer portion of the main body part 10 from the supply port 6, and is therefore bent in the middle of the document transport assistance member 100. When the document transport assistance member 100 is bent, there is a concern that the cover sheet 111 and the support sheet 121 may be easily separated at locations other than the first bonding part 131, and the position of the contained document M may be easily shifted due to the separation. However, in this embodiment, since the second bonding part 141 is formed along the first axis in a portion of the document transport assistance member 100, the separation between the cover sheet 111 and the support sheet 121 is suppressed, and positional displacement of the document M can be suppressed.

Further, in the document transport assistance member 100 set at the transport start position, the second bonding part 141 is located on the first direction side relative to a bent portion H where the document transport assistance member 100 is bent. In other words, the second bonding part 141 is located on the leading end side than the bent portion H in the document transport assistance member 100. Thus, regarding the document transport assistance member 100 set in a bent state, the separation and displacement of the cover sheet 111 and the support sheet 121 on the leading end side in the document transport assistance member 100 can be particularly suppressed.

Figure 8:
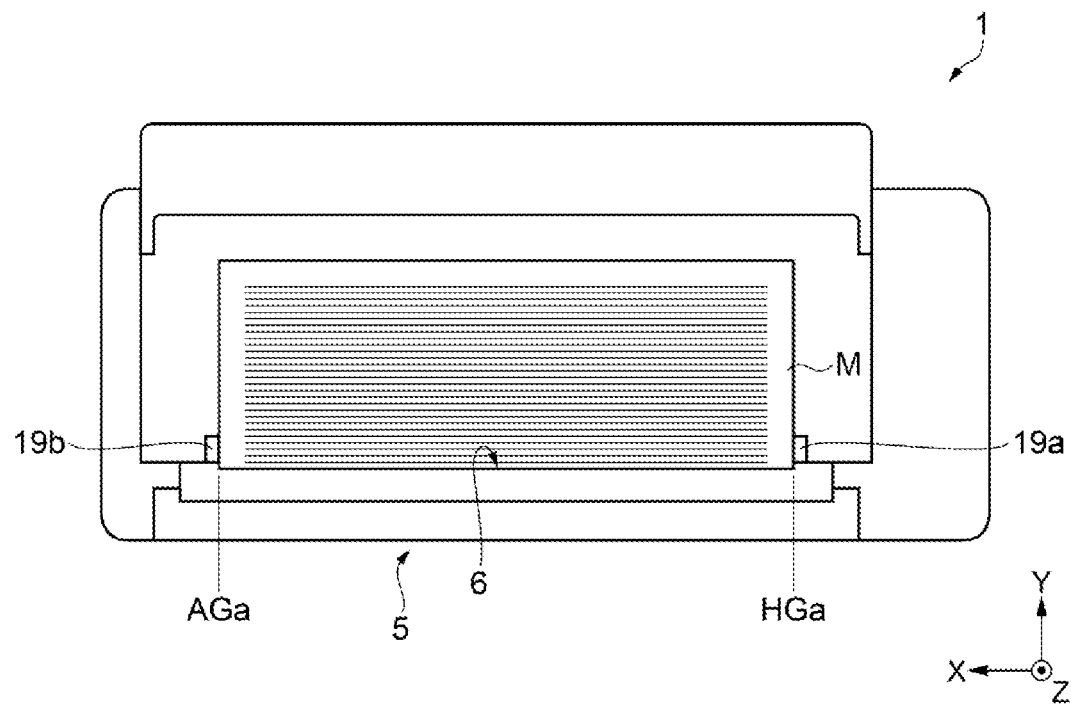
FIG. 8 is a schematic view of an image processing device for describing a configuration of a document transport assistance member according to a second embodiment.

Here, the operation of the edge guides 19a and 19b when the document transport assistance member 100 is set at the transport start position of the scanner unit 5 is described. FIG. 8 illustrates a state where the document M is guided for comparison, and FIG. 9 illustrates a state where the document transport assistance member 100 in which the document M is contained is guided.

In the image processing device 1 according to this embodiment, the edge guide 19a is a home-side guide, and the guide surface that makes contact with one end of the document M serves as a first position HGa as a set reference position, which serves as the reading reference of the document M with respect to the scanner unit 5. Accordingly, when setting the document M, as illustrated in FIG. 8, the edge guide 19b on the away side is moved in accordance with the size of the document M in the state where the edge guide 19a is fixed. The position of the edge guide 19b is a position AGa.

Figure 9:
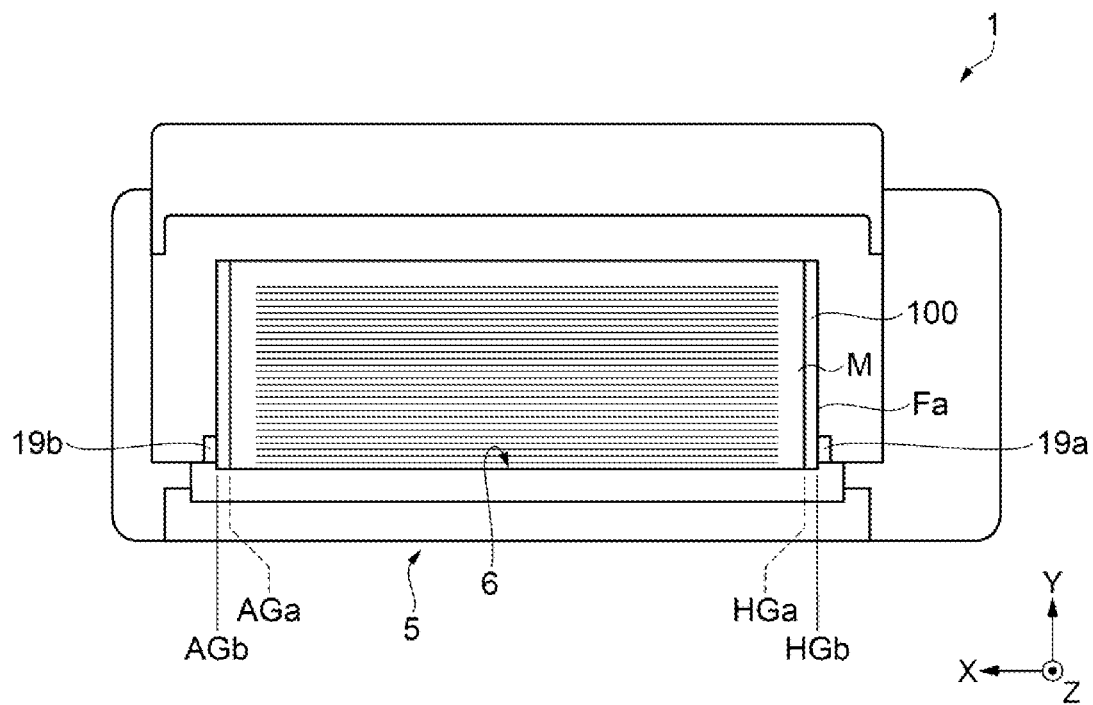
FIG. 9 is a schematic view illustrating an operation of the document transport assistance member according to the second embodiment.

On the other hand, in the case where the document transport assistance member 100 containing the document M is set as illustrated in FIG. 9, the reading reference of the document M is shifted to the +X direction side with respect to the first position HGa as the set reference position when the document transport assistance member 100 is set in the state where the edge guide 19a is fixed as illustrated in FIG. 8. Specifically, the reading reference of the document M is shifted with respect to the first position HGa to the +X direction side by the margin of the length S2 of the second end Fb and the first end Fa of the document transport assistance member 100. As such, in this embodiment, the edge guide 19a is moved from the first position HGa to a second position HGb in the −X direction. Specifically, the edge guide 19a is moved to the −X direction side by the margin of the length S2 of the document transport assistance member 100. That is, the length of the first position HGa and the second position HGb along the X axis is the length S2 of the margin of the document transport assistance member 100. Thus, the reading reference of the document M is located at the first position HGa, and the positional displacement of the reading position of the document M can be prevented.

Note that the position of the edge guide 19b is moved to a position AGb in accordance with the document transport assistance member 100.

Next, the scanner unit 5 is driven. Specifically, the first transport roller 15, the second transport roller 16, and the reading part 8 are driven. As a result, the document transport assistance member 100 is transported toward the first transport roller 15 along the transport path R with the rotation of the second transport roller 16.

Figure 10:
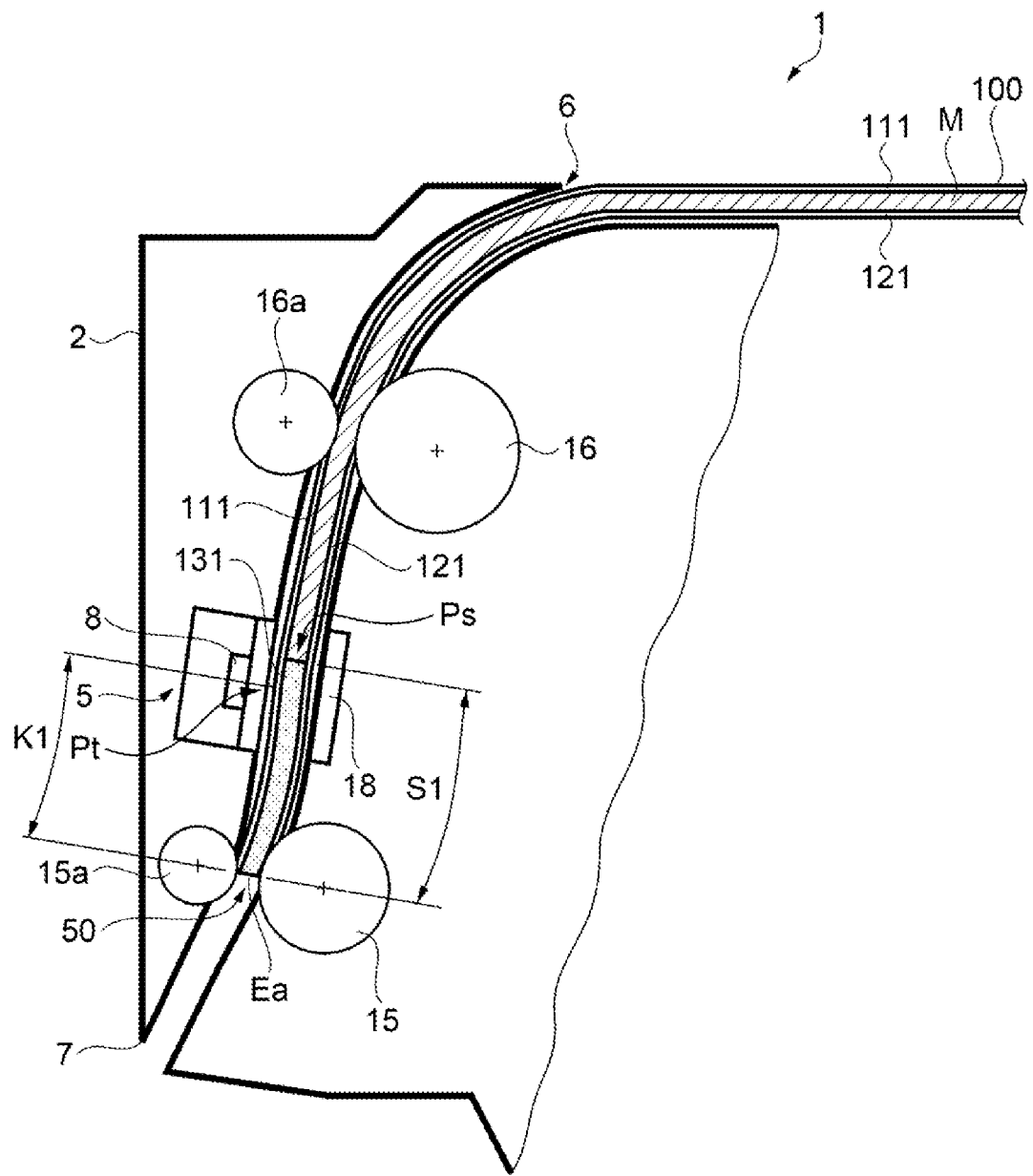
FIG. 10 is a schematic view illustrating an operation of the document transport assistance member.

As the document transport assistance member 100 is transported along the transport path R by the second transport roller 16, the leading end Ea of the document transport assistance member 100 makes contact with the first transport roller 15 as illustrated in FIG. 10. When the leading end Ea makes contact with the first transport roller 15, the transport speed of the document transport assistance member 100 is reduced. On the other hand, since the document transport assistance member 100 is transported by the second transport roller 16 to the first transport roller 15 side, the document transport assistance member 100 is partially deformed, and the posture of the document transport assistance member 100 varies in the transport path R. The posture of the document M also varies as the posture of the document transport assistance member 100 becomes poor. Here, when the reading at the reading part 8 is started in the state where the position of the document transport assistance member 100 is poor, the length of the space between the reading part 8 and the document M varies, and the reading accuracy decreases.

As such, in this embodiment, the length S1 between the leading end Ea of the document transport assistance member 100 and the rear end Eb of the first bonding part 131 is greater than the length K1 between the reading position Pt where the reading part 8 can read the document M and the first nipping part 50 of the first transport roller 15 in the transport path R. Specifically, at the time when the leading end Ea of the document transport assistance member 100 makes contact with the first transport roller 15, the reading start position Ps of the document M has not reached the reading position Pt of the reading part 8, and the margin of the first bonding part 131 of the document transport assistance member 100 faces the reading position Pt of the reading part 8.

Thereafter, when the document transport assistance member 100 is transported downstream in the transport path R by the first transport roller 15, the reading start position Ps of the document M reaches the reading position Pt, and the reading of the document M is started. Specifically, when the document transport assistance member 100 is transported by the first transport roller 15, the document transport assistance member 100 is set to a substantially straight-line form, and the reading of the document M is started in the state where the posture is stable. Thus, the length of the space between the reading part 8 of the image processing device 1 and the document M is constant and stable, and therefore the reading accuracy can be improved.

2. Second Embodiment

Figure 11:
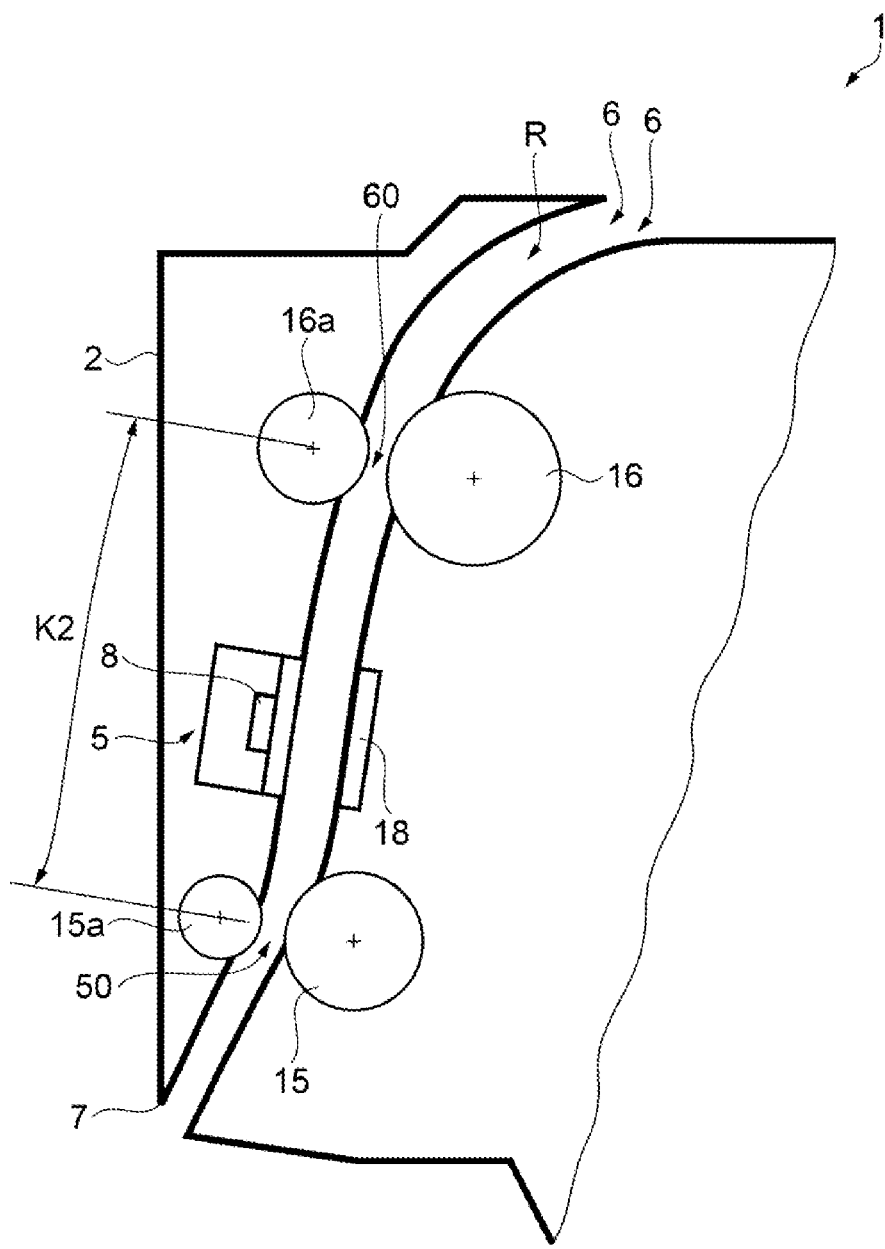
FIG. 11 is a schematic view of the image processing device for describing a configuration of a document transport assistance member according to the second embodiment.
Figure 12:
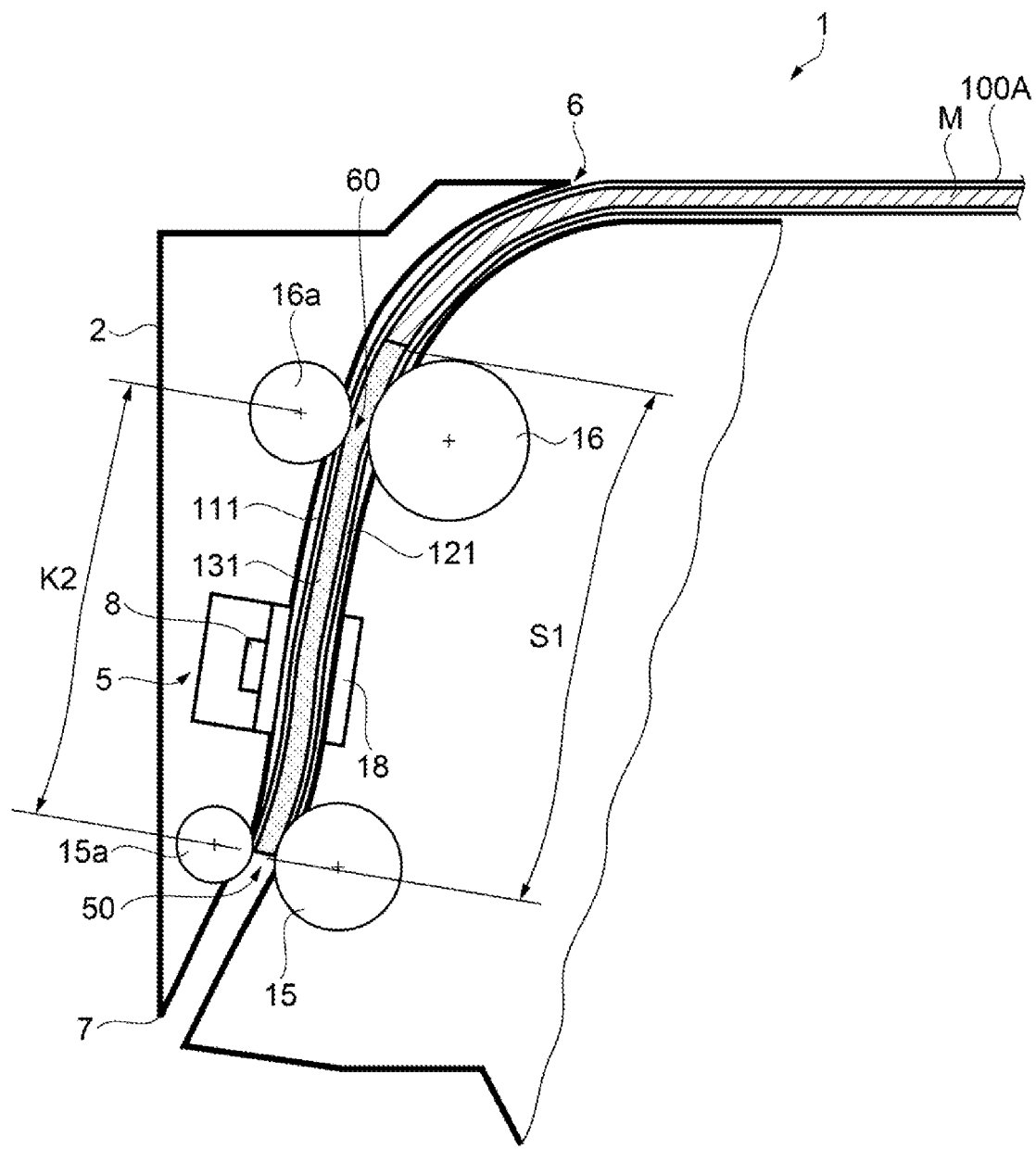
FIG. 12 is a schematic view illustrating an operation of the document transport assistance member according to the second embodiment.

Next, a second embodiment is described. FIG. 11 is a schematic view of the image processing device 1 for describing a configuration of a document transport assistance member 100A according to this embodiment. FIG. 12 is a schematic view illustrating an operation of the document transport assistance member 100A according to this embodiment.

Note that the configuration of the image processing device 1 is the same as that of the first embodiment, and therefore the description thereof is omitted.

First, a configuration of the document transport assistance member 100A of this embodiment is described. In the document transport assistance member 100A, the length S1 between the leading end Ea of the document transport assistance member 100A in the first direction D1 and the rear end Eb of the first bonding part 131 is greater than a length K2 between the second nipping part 60 of the second transport roller 16 and the first nipping part 50 of the first transport roller 15 in the transport path R. Here, the position of the first nipping part 50 is the center position of the nip width when the first transport roller 15 and the first nip roller 15a press the document transport assistance member 100A in the transport direction, and the position of the second nipping part 60 is the center position of the nip width when the second transport roller 16 and the second nip roller 16a press the document transport assistance member 100A in the transport direction. In addition, the length K2 is the length between the position of the second nipping part 60 and the position of the first nipping part 50 in the transport path R, and is a length also including a bent portion of the transport path R to some degree. In other words, the length K2 is not the shortest distance between the first nipping part 50 and the second nipping part 60.

Note that the configuration other than the definition of the length S1 of the document transport assistance member 100A is the same as that of the first embodiment, and therefore the description thereof is omitted.

Next, an operation of the document transport assistance member 100A in the image processing device 1 is described.

First, in the same manner as in the first embodiment, the document M is put in the document transport assistance member 100A, and the document transport assistance member 100A is set at the transport start position of the scanner unit 5 of the image processing device 1. Thereafter, the scanner unit 5 is driven. When the first transport roller 15, the second transport roller 16, and the reading part 8 are driven, the document transport assistance member 100A is transported along the transport path R toward the first transport roller 15 with the rotation of the second transport roller 16.

As illustrated in FIG. 9, the document transport assistance member 100A is transported along the transport path R by the second transport roller 16.

Here, for example, in the case where the length between the rear end Eb of the first bonding part 131 and the leading end Ea of the document transport assistance member 100A in the transport direction is extremely small, when the region where the cover sheet 111, the document M, and the support sheet 121 overlap is nipped and transported between the second transport roller 16 and the second nip roller 16a, the cover sheet 111 or the support sheet 121 that makes contact with the second transport roller 16 or the second nip roller 16a may slip with respect to the contained document M, and the cover sheet 111 and the support sheet 121 may move in a relatively shifted manner. When the cover sheet 111 or the support sheet 121 moves with respect to the contained document M, the cover sheet 111 or the support sheet 121 is brought into a turned-up state. In view of this, in this embodiment, the length S1 between the leading end Ea of the document transport assistance member 100A and the rear end Eb of the first bonding part 131 is greater than the length K2 between the second nipping part 60 of the second transport roller 16 and the first nipping part 50 of the first transport roller 15 in the transport path R. Specifically, the occurrence of turning-up of the cover sheet 111 or the support sheet 121 is reduced in the process of transporting the document transport assistance member 100A from the second transport roller 16 toward the first transport roller 15. In addition, since the document transport assistance member 100A is transported in a stable posture even after the first transport roller 15 performs nip on the document transport assistance member 100A, a variation between the length of the cover sheet 111 or the support sheet 121 in the transport direction and the length of the document M in the transport direction is less likely to occur, and the occurrence of the turning-up of the cover sheet 111 or the support sheet 121 is reduced.

In addition, as in the first embodiment, at the time when the leading end Ea of the document transport assistance member 100A makes contact with the first transport roller 15, the document M has not reached the reading position Pt, and the margin of the first bonding part 131 of the document transport assistance member 100A corresponds to it. Then, the reading of the document M is started in the state where the posture of the document transport assistance member 100A is stable in a substantially straight-line shape. Thus, the image quality can be improved.

3. Third Embodiment

Figure 13:
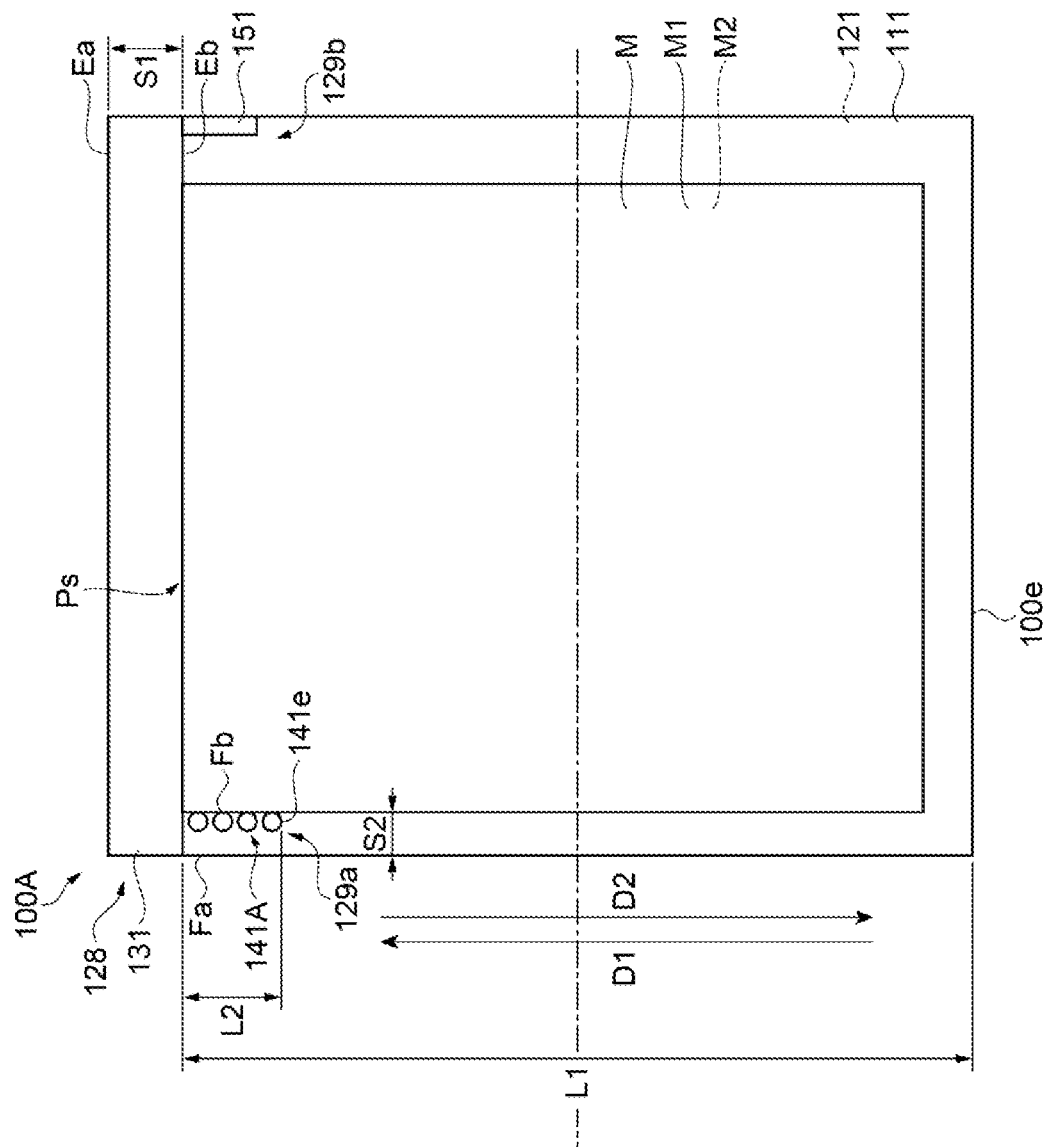
FIG. 13 is a plan view illustrating a configuration of the document transport assistance member according to a third embodiment.

Next, a third embodiment is described. FIG. 13 is a plan view illustrating a configuration of the document transport assistance member 100A according to this embodiment. A configuration different from the configuration of the first embodiment, i.e., a configuration of a second bonding part 141A of the document transport assistance member 100A, is described below. The configuration other than the second bonding part 141A is the same as that of the first embodiment, and therefore the description thereof is omitted.

As illustrated in FIG. 13, the document transport assistance member 100A includes the cover sheet 111 configured to cover the first surface M1 of the document M and the support sheet 121 configured to cover the second surface M2 of the document M.

The document transport assistance member 100A includes the first bonding part 131 where the cover sheet 111 and the support sheet 121 are bonded together. Specifically, the first bonding part 131 is provided in the first end portion 128 on the side of the first direction D1 along the first axis corresponding to the transport path R. The first bonding part 131 is provided in a band shape along the second axis that intersects the first axis. In the first bonding part 131, the cover sheet 111 and the support sheet 121 are bonded together with an adhesive tape and/or by ultrasonic welding, for example.

The document transport assistance member 100A includes the second bonding part 141A located in the one end portion 129a of the document transport assistance member 100A with respect to the second axis that intersects the first axis, and the second bonding part 141A includes a portion on the side of the second direction D2 opposite the first direction D1 relative to the first bonding part 131 with respect to the first axis. The second bonding part 141A of this embodiment is located in the one end portion 129a corresponding to the edge guide 19a side in the document transport assistance member 100. The second bonding part 141A is formed toward the second direction D2 from a position separated from the rear end Eb of the first bonding part 131 on the second direction D2 side. In other words, a gap is formed between the rear end Eb of the first bonding part 131 and the end portion of the second bonding part 141A on the first direction D1 side. Note that the second bonding part 141A is bonded in the same manner as described above.

In addition, the second bonding part 141A may include a plurality of bonding parts along the first axis, for example. In this case, a gap is formed between each bonding part of the second bonding part 141A.

When the document M is put in the document transport assistance member 100A, the reading reference position of the document M can be defined by lifting the cover sheet 111 from the support sheet 121 and bringing the document M into contact with the rear end Eb of the first bonding part 131 and the second end Fb of each bonding part of the second bonding part 141A.

In addition, with the gap formed between the rear end Eb of the first bonding part 131 and the end portion of the second bonding part 141A on the first direction D1 side, when the cover sheet 111 is lowered to the support sheet 121 after the document M is inserted, air between the support sheet 121 and the cover sheet 111 can be easily evacuated to the outside through the gap, and thus the ease of containment of the document M in the document transport assistance member 100A can be improved.

4. First Modification

In the above-described embodiments, the document transport assistance members 100 and 100A include the second bonding part 141 and the third bonding part 151, but this is not limitative. For example, the document transport assistance members 100 and 100A may have a structure in which the second bonding part 141 and the third bonding part 151 are omitted. Even with such a structure, the reading accuracy of the medium M at the reading part 8 can be maintained.

Contents derived from the embodiments will be described below.

A document transport assistance member is configured to be used for an image processing device including a first transport roller configured to transport a document, and a reading part configured to read image information of the document, which is transported, at a position upstream of the first transport roller in a transport path through which the document is transported. In addition, the document transport assistance member includes a cover sheet configured to cover a first surface of the document, the first surface being a surface to be read by the reading part, and a support sheet configured to cover a second surface of the document, the second surface being an opposite surface from the first surface, the document transport assistance member further comprising a first bonding part serving as a bonding part where the cover sheet and the support sheet are bonded together, the first bonding part being configured to bond a first end portion at a first direction side along a first axis, wherein a length between a leading end of the document transport assistance member and a rear end of the first bonding part is greater than a length between a reading position where the reading part is configured to read the document and a position of a first nipping part where the first transport roller performs nip on the document transport assistance member in the transport path, the leading end of the document transport assistance member being an end of the document transport assistance member at the first direction side, and the rear end of the first bonding part being an end of the first bonding part at a second direction side that is an opposite direction from the first direction.

When the user reads the document with the image processing device using the document transport assistance member, the user puts the document between the cover sheet and the support sheet, and feeds it into the image processing device along the first direction in the state where the first bonding part side of the document transport assistance member is set on the leading end side.

The leading end, which is the end on the first direction side of the document transport assistance member fed into the image processing device, makes contact with the first transport roller. When the side end of the document transport assistance member makes contact with the first transport roller, the posture of the document transport assistance member varies. When the reading is started in the state where the posture of the document transport assistance member is poor, the length of the space between the reading part and the document varies between the states before and after the document transport assistance member makes contact with the first transport roller, and consequently the reading accuracy is reduced.

However, in the configuration described above, the length between the leading end of the document transport assistance member and the rear end of the first bonding part is greater than the length between the reading position where the reading part can read the document and the first nipping part of the first transport roller in the transport path. That is, at the time when the side end of the document transport assistance member makes contact with the first transport roller, the document has not reached the reading position, and the first bonding part of the document transport assistance member faces the reading position. Thereafter, when the document transport assistance member is transported along the first direction by the first nipping part of the first transport roller, the document reaches the reading position, and the reading of the document is started. That is, the first transport roller transports the document transport assistance member at a constant speed, and the reading of the document is started in the state where the transport posture of the document transport assistance member is stable. Thus, the length of the space between the reading part of the image processing device and the document is stabilized, and therefore the reading accuracy can be improved.

In the document transport assistance member, the image processing device may include a second transport roller configured to transport the document at a position upstream of the reading position in the transport path, and a length between the leading end of the document transport assistance member and the rear end of the first bonding part may be greater than a length between a second nipping part where the second transport roller performs nip on the document transport assistance member and the first nipping part of the first transport roller in the transport path.

For example, when the region where the cover sheet, the document, and the support sheet overlap is nipped and transported between the second transport roller and the second nip roller in the case where the length between the leading end of the document transport assistance member and the rear end of the first bonding part in the transport direction is small, the cover sheet or the support sheet that makes contact with the second transport roller or the second nip roller may slip with respect to the contained document, and the cover sheet and the support sheet may move in a relatively shifted manner. In particular, in the state where it is not nipped between the first transport roller and the first nip roller, movement of the leading end of the document transport assistance member is not suppressed, and consequently the cover sheet and the support sheet are more easily shifted. When the cover sheet or the support sheet moves with respect to the contained document, the cover sheet or the support sheet is brought into a turned-up state. In view of this, according to the configuration described above, the length between the side end of the document transport assistance member and the rear end of the first bonding part is greater than the length between the first nipping part of the first transport roller and the second nipping part of the second transport roller in the transport path. That is, the occurrence of turning-up of the cover sheet or the support sheet is reduced in the process of transporting the document transport assistance member from the second transport roller toward the first transport roller. In addition, since the document transport assistance member is transported in a stable posture even after the first transport roller performs nip on the document transport assistance member, a variation between the length of the cover sheet or the support sheet in the transport direction and the length of the document in the transport direction is less likely to occur, and the occurrence of turning-up of the cover sheet or the support sheet is reduced.

In the document transport assistance member, the document transport assistance member may be bent in a state where the document transport assistance member is set at a transport start position of the image processing device, and the document transport assistance member may include a second bonding part disposed along the first axis and at a position that overlaps the document to be contained in the document transport assistance member, when the document transport assistance member is viewed in a side view from a direction intersecting the first axis.

With this configuration, when the document transport assistance member is set at the transport start position of the image processing device and the document transport assistance member is bent, the cover sheet and the support sheet are easily separated at locations other than the first bonding part, and the position of the contained document is easily shifted due to the separation. With the configuration described above, however, the separation between the cover sheet and the support sheet is suppressed with the second bonding part, and therefore the positional displacement of the document can be suppressed.

In the document transport assistance member, in the document transport assistance member set at the transport start position, the second bonding part may be located farther toward the first direction side than a portion where the document transport assistance member is bent.

With this configuration, regarding the document transport assistance member set in a bent state, the separation and positional displacement of the cover sheet and the support sheet on the leading end side of the document transport assistance member can be particularly suppressed.

The document transport assistance member may include a second bonding part serving as the bonding part and located at one-side end portion of a second axis that intersects the first axis in the document transport assistance member, the second bonding part including a portion located farther toward the second direction side than the first bonding part, and the cover sheet and the support sheet may not be bonded together in a region farther toward the second direction side than the second bonding part, and, the cover sheet and the support sheet may not be bonded together in a region along the second axis between the second bonding part and another-side end portion, along the second axis, of the document transport assistance member except in the first bonding part.

With this configuration, the region where the cover sheet can be opened with respect to the support sheet is relatively wide, and therefore the document can be smoothly inserted. In addition, when the document is put in the document transport assistance member, the side end of the document is regulated by the second bonding part. Thus, the protrusion of the document from the document transport assistance member is suppressed, and the end portion of the document can be protected.

Further, no bonding part is formed in the region on the other side of the second bonding part with respect to the second axis. Thus, the size of the document M that can be contained in one document transport assistance member is not fixed to one type, and the documents M of a wide variety of sizes can be applied to one document transport assistance member.

In the document transport assistance member, the second bonding part may be separated from a side end at one side of at least one of the cover sheet and the support sheet.

With this configuration, the second bonding part is disposed such that a gap is formed between the side end of the document and the side end of the document transport assistance member. Thus, the end portion of the document can be reliably protected.

In the document transport assistance member, a rear end of the second bonding part, which is an end at the second direction side may be located farther toward the first direction side than a midpoint between the rear end of the first bonding part and a rear end, which is an end of the document transport assistance member at the second direction side.

With this configuration, more than half of the cover sheet can be opened with respect to the support sheet, and therefore the document can be smoothly inserted.

In the document transport assistance member, a length along the first axis between the rear end of the second bonding part and the rear end of the first bonding part may be smaller than 2 inches.

With this configuration, the cover sheet can be largely opened with respect to the support sheet, and the document can be smoothly inserted. In particular, in the case where the length regulated by the second bonding part is smaller than the short side of the document of the smallest size, the document of the smallest size can be easily put in the document transport assistance member since the corner end of the document can be aligned with the first bonding part and the second bonding part in the state where the document is partially exposed.

An image processing device is configured to use the document transport assistance member.

With this configuration, the reading of the document is started in the state where the transport posture of the document transport assistance member is stable. Thus, the image quality can be improved.

What is claimed is:
1. A document transport assistance member used for an image processing device, the image processing device including:
   a first transport roller configured to transport a document; and
   a reading part configured to read image information of the document, which is transported, at a position upstream of the first transport roller in a transport path through which the document is transported, the document transport assistance member comprising:

a cover sheet configured to cover a first surface of the document, the first surface being a surface to be read by the reading part; and a support sheet configured to cover a second surface of the document, the second surface being an opposite surface from the first surface, the document transport assistance member further comprising a first bonding part serving as a bonding part where the cover sheet and the support sheet are bonded together, the first bonding part being configured to bond a first end portion at a first direction side along a first axis, wherein a length between a leading end of the document transport assistance member and a rear end of the first bonding part is greater than a length between a reading position where the reading part is configured to read the document and a position of a first nipping part where the first transport roller performs nip on the document transport assistance member in the transport path, the leading end of the document transport assistance member being an end of the document transport assistance member at the first direction side, and the rear end of the first bonding part being an end of the first bonding part at a second direction side that is an opposite direction from the first direction.

2. The document transport assistance member according to claim 1, wherein the image processing device includes a second transport roller configured to transport the document at a position upstream of the reading position in the transport path, and a length between the leading end of the document transport assistance member and the rear end of the first bonding part is greater than a length between a second nipping part where the second transport roller performs nip on the document transport assistance member and the first nipping part of the first transport roller in the transport path.

3. The document transport assistance member according to claim 1, wherein the document transport assistance member is bent in a state where the document transport assistance member is set at a transport start position of the image processing device; and the document transport assistance member includes a second bonding part disposed along the first axis and at a position that overlaps the document to be contained in the document transport assistance member, when the document transport assistance member is viewed in a side view from a direction intersecting the first axis.

4. The document transport assistance member according to claim 3, wherein in the document transport assistance member set at the transport start position, the second bonding part is located farther toward the first direction side than a portion where the document transport assistance member is bent.

5. The document transport assistance member according to claim 1, comprising a second bonding part serving as the bonding part and located at one-side end portion of a second axis that intersects the first axis in the document transport assistance member, the second bonding part including a portion located farther toward the second direction side than the first bonding part, wherein the cover sheet and the support sheet are not bonded together in a region farther toward the second direction side than the second bonding part, and the cover sheet and the support sheet are not bonded together in a region along the second axis between the second bonding part and another-side end portion, along the second axis, of the document transport assistance member except in the first bonding part.

6. The document transport assistance member according to claim 5, wherein the second bonding part is separated from a side end at one side of at least one of the cover sheet and the support sheet.

7. The document transport assistance member according to claim 5, wherein a rear end of the second bonding part, which is an end at the second direction side is located farther toward the first direction side than a midpoint between the rear end of the first bonding part and a rear end, which is an end of the document transport assistance member at the second direction side.

8. The document transport assistance member according to claim 7, wherein a length along the first axis between the rear end of the second bonding part and the rear end of the first bonding part is smaller than 2 inches.

9. An image processing device configured to use the document transport assistance member according to claim 1.

* * * * *